US006741824B2

(12) United States Patent
Ojima et al.

(10) Patent No.: US 6,741,824 B2
(45) Date of Patent: May 25, 2004

(54) CHARGING SYSTEM, PROCESS CARTRIDGE AND IMAGE FORMING APPARATUS

(75) Inventors: Masaki Ojima, Shizuoka (JP); Noboru Kashimura, Shizuoka (JP); Keiji Okano, Shizuoka (JP); Junichi Kato, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/418,219

(22) Filed: Apr. 18, 2003

(65) Prior Publication Data

US 2003/0198485 A1 Oct. 23, 2003

(30) Foreign Application Priority Data

Apr. 23, 2002 (JP) ...................................... 2002-120301

(51) Int. Cl.[7] ................................................ C03G 15/02
(52) U.S. Cl. ........................ 399/174; 399/159; 399/176
(58) Field of Search ................................ 399/174, 175, 399/176, 159; 430/902, 56

(56) References Cited

U.S. PATENT DOCUMENTS

| | | | | |
|---|---|---|---|---|
| 5,543,899 A | | 8/1996 | Inami et al. | 355/219 |
| 5,589,918 A | | 12/1996 | Oshida et al. | 399/114 |
| 5,682,574 A | | 10/1997 | Oshida et al. | 399/64 |
| 5,765,077 A | | 6/1998 | Sakurai et al. | 399/176 |
| 5,790,927 A | | 8/1998 | Ando et al. | 399/176 |
| 5,809,379 A | | 9/1998 | Yano et al. | 399/159 |
| 6,004,710 A | | 12/1999 | Takagi et al. | 430/66 |
| 6,118,965 A | * | 9/2000 | Hirabayashi et al. | 399/175 |
| 6,128,462 A | | 10/2000 | Kato et al. | 399/350 |
| 6,134,407 A | | 10/2000 | Ishiyama et al. | 399/174 |
| 6,163,671 A | * | 12/2000 | Ishiyama et al. | 399/176 |
| 6,169,869 B1 | | 1/2001 | Inami et al. | 399/159 |
| 6,175,703 B1 | | 1/2001 | Nakazono et al. | 399/111 |
| 6,188,852 B1 | | 2/2001 | Ojima et al. | 399/25 |
| 6,226,480 B1 | * | 5/2001 | Hirabayashi et al. | 399/174 |
| 6,317,574 B1 | | 11/2001 | Shinohara et al. | 399/176 |
| 6,337,964 B2 | | 1/2002 | Inami et al. | 399/254 |
| 6,343,193 B1 | | 1/2002 | Matsumoto et al. | 399/27 |
| 6,532,030 B2 | | 3/2003 | Okano et al. | 347/131 |
| 6,539,190 B2 | | 3/2003 | Oba et al. | 399/174 |
| 6,580,889 B1 | * | 6/2003 | Ishiyama et al. | 399/174 |
| 6,647,229 B2 | * | 11/2003 | Haraguchi et al. | 399/176 |

FOREIGN PATENT DOCUMENTS

| | | |
|---|---|---|
| JP | 6-3921 | 1/1994 |
| JP | 10-307454 | 11/1998 |
| JP | 2000-81760 | 3/2000 |

* cited by examiner

*Primary Examiner*—Joan Pendegrass
(74) *Attorney, Agent, or Firm*—Fitzpatrick, Cella, Harper & Scinto

(57) ABSTRACT

An image forming apparatus has an image bearing member; and a charging member forming a nip with the image bearing member to charge the image bearing member. Conductive particles are provided in the nip and a time factor $\alpha$ represented by a following equation satisfies a condition $\alpha>15$:

$$\alpha=2\pi\cdot k\cdot Nc\cdot(W/Vc)/(\rho\cdot Cd\cdot Z)$$

$$Z=-0.5\cdot 1n(\pi\cdot k\cdot Nc)-1n(\sqrt{\beta}\cdot D/2)$$

$$(\beta=1.1932)$$

in which $\rho$ ($\Omega$) represents a surface resistivity of said image bearing member; Cd (F/mm$^2$) represents an electrostatic capacitance of the image bearing member; D (mm) represents a diameter of the conductive particle; Nc (particle/mm$^2$) represents a density of the conductive particles present on the charging member; Vc (mm/sec) represents a surface moving speed of the charging member; Vd (mm/sec) represents a surface moving speed of the image bearing member; k=Vc/Vd; and W (mm) represents a width of the nip in the moving direction of the image bearing member.

21 Claims, 3 Drawing Sheets

CHARGING SYSTEM, PROCESS CARTRIDGE AND IMAGE FORMING APPARATUS

BACKGROUND OF THE INVENTION

1. Field of the Invention

The present invention relates to a charging system, a process cartridge and an image forming apparatus, in which charging is executed with conductive particles.

2. Description of the Related Art

In an image recording apparatus such as an electrophotographic apparatus or an electrostatic recording apparatus, a corona charger has been employed as a charging apparatus for a uniform charging process (including charge elimination) to obtain a desired polarity and potential of an image bearing member (member to be charged) such as an electrophotographic photosensitive member or an electrostatic recording dielectric member.

Recently there is also in use a charging apparatus of a contact method (contact charging apparatus) which executes charging by contacting a charging member, to which a voltage is applied, with the member to be charged. However, even in such contact charging apparatus, drawbacks resulting from by products of the discharge, such as ozone, are basically not avoidable.

In order to avoid such drawbacks, there has been proposed an injection charging method in which a charge is directly injected from a contact charging member into the member to be charged. For example, there is utilized a mechanism of direct charge injection by applying a voltage to a contact charging member such as a charging magnetic brush, and injecting a charge into a trap level originally present in a surface of the member to be charged or into a trap level arbitrarily prepared by forming a charge injection layer including a charge retaining material such as conductive particles (Japanese Patent Application Laid-open No. 06-003921).

In contrast to the known contact charging which is principally based on a discharge phenomenon and requires an application of a voltage equal to or higher than a discharge threshold value, the above-mentioned injection charging allows to charge the member to be charged to a potential corresponding to an applied voltage, even below the discharge threshold value.

However, in the injection charging method employing a magnetic brush or the like as employed in the aforementioned Japanese Patent Application Laid-open No. 06-003921, a mechanism for holding the charged magnetic particles and maintaining such charged magnetic particles in sliding contact with the member to be charged is a factor of an increase in the cost.

Therefore, for a simpler injection charging method, there is proposed, as disclosed in Japanese Patent Application Laid-open No. 10-307454 etc., a configuration in which conductive fine particles (conductive particles) for improving the contact charging property are made present on a flexible roller constituting a contact member. In such configuration, the contact between the contact charging member and the member to be charged can be controlled by an amount or a size of the present conductive particles and satisfactory charging ability can be obtained.

Also the contact charging method employing conductive particles is advantageously employed in a cleanerless system, in which there is no mechanism for removing a developer remaining on the member to be charged after a transfer step, and there is proposed, as shown in Japanese Patent Application Laid-open No. 2000-081760, a configuration of mixing the conductive particles in the developer thereby maintaining the amount of the conductive particles on the contact charging member and sustaining the charging ability thereof.

In the aforementioned contact injection charging method utilizing the conductive particles, it is already known that the charging condition is determined by mutual correlation of various parameters, but the correlation of individual parameter is not clarified and it has been difficult to predict an applicable range for each individual parameter under various situations.

For this reason, the charging state shows significant fluctuation in the stability under environmental conditions or in durability, creating an obstacle in the system designing.

In particular the injection charging characteristics are influenced also by the electrical characteristics of the member to be charged, and it has been desired for example to realize an appropriate surface resisvity on the member to be charged.

SUMMARY OF THE INVENTION

An object of the present invention is to provide a charging system, a process cartridge and an image forming apparatus capable, in a charging method utilizing conductive particles, of realizing appropriate various conditions relating to the charging.

Another object of the present invention is to provide a charging system, a process cartridge and an image forming apparatus suitable for an injection charging method.

Still another object of the present invention is to provide a charging system, a process cartridge and an image forming apparatus in which electrical characteristics of a member to be charged are made appropriate.

Still another object of the present invention is to provide a charging system, a process cartridge and an image forming apparatus with a high charging stability.

Still other objects of the present invention, and the features thereof, will become fully apparent from the following detailed description, which is to be taken in conjunction with the accompanying drawings.

DETAILED DESCRIPTION OF THE PREFERRED EMBODIMENTS

In the following, there will be given an explanation of a charging system, a process cartridge and an image forming apparatus of the present invention, with reference to FIGS. 1 to 3.

Figure 1:
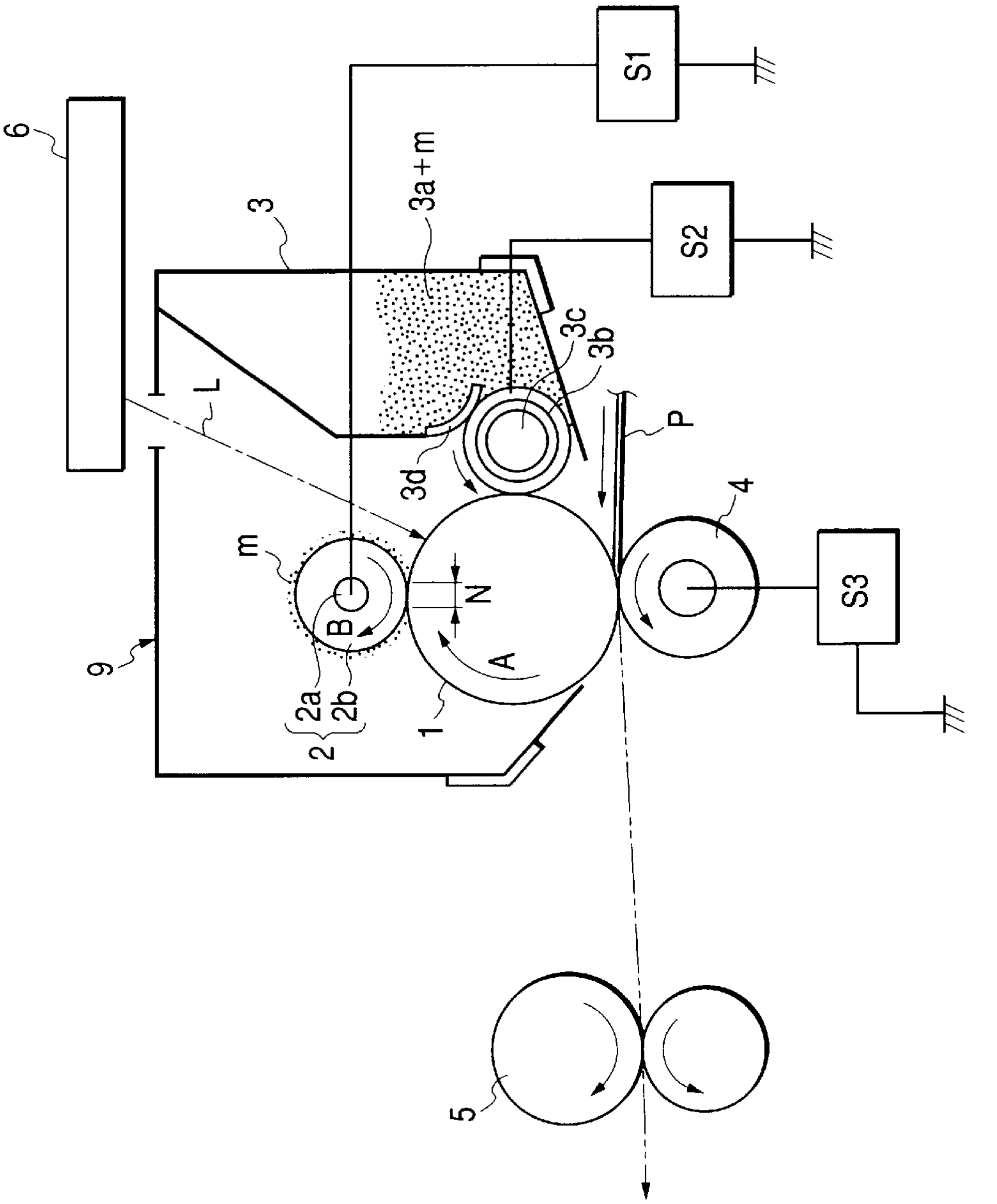
FIG. 1 is a schematic view showing the configuration of an image forming apparatus of an embodiment.

FIG. 1 is a schematic view showing the configuration of an image forming apparatus constituting an embodiment.

The image forming apparatus of the present embodiment is a laser beam printer, utilizing an electrophotographic process of transfer method, a direct injection charging method utilizing conductive particles (charging accelerating particles), a reversal development method, and a process cartridge method.

(1) Schematic Entire Configuration of Printer

In FIG. 1, there are shown a photosensitive drum 1 of a diameter of 30 mm, constituting a member to be charged (image bearing member), a charging roller 2 of a diameter of 18 mm, constituting a contact charging member, a developing apparatus 3, a transfer roller 4 constituting a transfer charging apparatus, a fixing apparatus 5, and a laser beam scanner 6 constituting an exposure apparatus.

A. Charging step: The photosensitive drum 1 is rotated, in a direction A shown in FIG. 1, with a predetermined peripheral speed (process speed) Vd (mm/sec). The charting roller 2 is coated in advance with conductive particles m in an unused state of the apparatus, is contacted with the photosensitive drum 1 under a predetermined pressure, and is rotated with a predetermined peripheral speed Vc (mm/sec) in a direction B (indicated in FIG. 1) opposite to the rotating direction A of the photosensitive drum 1 at a contact portion (charging nip) N. The charging roller 2 executes, at the contact portion N with the photosensitive drum 1, a uniform injection charging of an external periphery thereof with a predetermined polarity and to a predetermined potential. In the present embodiment, the charging was made to about −700 V. A charging system is formed by the photosensitive drum 1 constituting the member to be charged, the charging roller 2 constituting the charging member and the conductive particles m.

B. Exposure step: The periphery of the photosensitive drum 1, subjected to the injection charging in the aforementioned charging step, is subjected to a laser exposure L by the laser beam scanner 6, whereby an electrostatic latent image corresponding to a desired pattern (image information) is formed.

C. Development step: The electrostatic latent image formed on the periphery of the photosensitive drum 1 is developed in the developing apparatus 3 and visualized as a toner image. The development step of the present embodiment is a reversal development employing a one-component magnetic negative toner as a developer 3*a*. In the present embodiment, the toner constituting the developer had an average particle size of 7 μm.

The developing apparatus 3 has a developing sleeve 3*b* comprised of a developer carrying member and a magnet roller 3*c* provided in the developing sleeve 3*b*, and the development is executed by applying a developing bias, from a developing bias source S2, between the developing sleeve 3*b* and the photosensitive drum 1. In the present embodiment, the developing bias voltage is formed by superposing the following DC component and AC component:

DC voltage: −500 V

AC voltage: a rectangular wave with a peak-to-peak voltage of 1600 V and a frequency of 1.8 kHz.

D. Transfer step: The toner image formed on the periphery of the photosensitive drum 1 is transferred, by the transfer roller 4, onto a recording material P fed at a predetermined controlled timing from an unrepresented sheet feeding portion.

The transfer roller 4 is given a predetermined transfer bias voltage from a transfer bias source S3. In the present embodiment, a DC voltage of +2 kV was applied as the transfer bias voltage.

E. Fixation step: The recording material P, having received the transferred toner image, is conveyed to the fixing apparatus 5 and is subjected to a fixing process by heat and pressure, and is discharged as a completed image (print or copy) from the apparatus.

F. Recovery step: Toner not transferred in the transfer step but remaining on the periphery of the photosensitive drum 1 is carried to the charging nip of the aforementioned charging step. A part of the residual toner adheres to the charging roller while another part passes the charging nip in a state stuck to the photosensitive member.

The toner passing through the charging nip is charged into a proper polarity of the toner (negative polarity in the present embodiment) in the charging step, by the injection charging similar to that for the surface of the photosensitive member, and is rendered recoverable in the succeeding development step. Also the residual toner, adhering to the charging roller, is eventually charged in the proper polarity as explained above in passing the charging nip plural times, thereby being transferred to the photosensitive member and is rendered recoverable in the succeeding development step.

In the development step, the toner in an exposed area remains on the photosensitive member (namely being developed), while the toner in an unexposed area is recovered into the developing apparatus. In this manner, the developing apparatus executes a developing operation and a recovering operation at the same time.

In the printer of the present embodiment, the photosensitive drum 1, the charging roller 2 and the developing apparatus 3 are formed into an integral process unit (process cartridge) 9, which is detachably mounted and rendered replaceable in the main body of the printer.

(2) Photosensitive Drum

The photosensitive drum 1 employed in the present embodiment is a photosensitive member having a charge injection layer 16 (FIG. 2) for facilitating a resistance regulation. The charge injection layer 16 of the photosensitive member is formed by mixing and dispersing $SnO_2$ ultra fine particles 16*a* (particle size about 0.03 μm) and a lubricant such as Teflon (registered trade name) in a photosettable acrylic resin, followed by a film formation by coating and photosetting.

Figure 2:
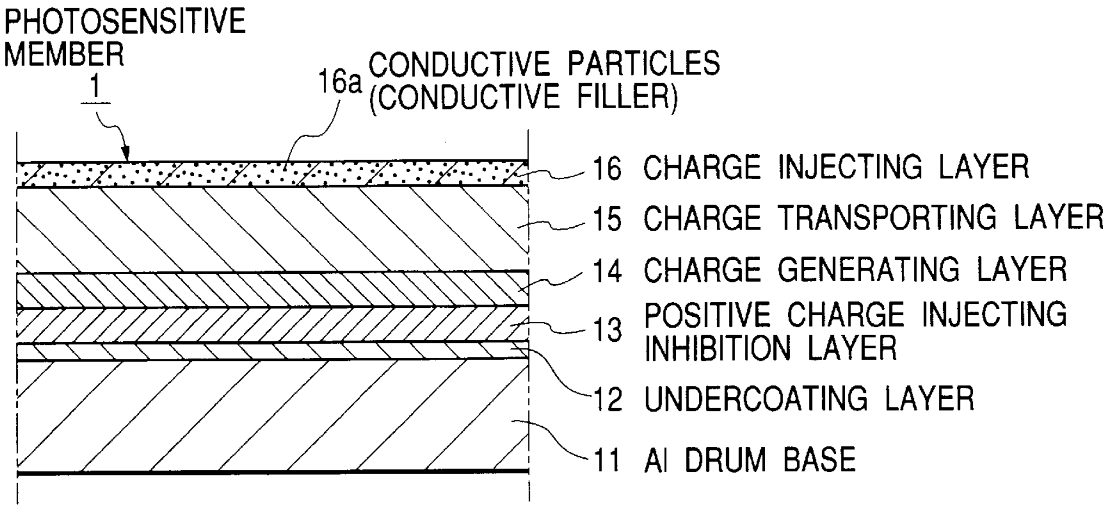
FIG. 2 is a schematic view showing a layer configuration of an employed photosensitive drum.

FIG. 2 is a schematic view showing a layered configuration of the photosensitive drum employed in the present embodiment. The photosensitive drum 1 is formed by coating the aforementioned charge injection layer 16 for improving the charge injection property, on an ordinary organic photosensitive drum which is prepared by coating, on an aluminum drum-shaped substrate 11, an undercoat layer 12, a positive charge injection inhibiting layer 13, a charge generating layer 14 and a charge transporting layer 15 in succession.

An important factor in the direct charge injection method is the resistance of a surface layer. An efficient charge transfer can be realized by reducing the resistance at the side of the member to be charged. On the other hand, in case of the use as a photosensitive member, the resistance cannot be reduced beyond a certain level because the electrostatic latent image has to be retained for a certain period. In the present embodiment, there were prepared several samples each having a different in the resistance for its surface layer, in order to measure a time factor α, to be explained later.

Figure 3:
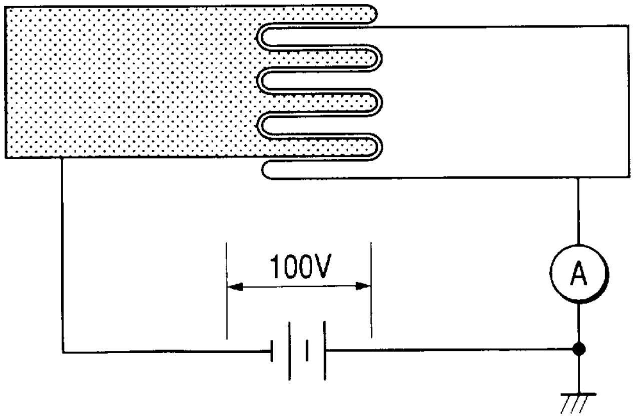
FIG. 3 is a schematic view showing a method for measuring a surface resistivity of a photosensitive layer.

In the present embodiment, the resistance of the surface layer is measured by evaporating, on the prepared photosensitive drum, comb tooth-shaped electrodes as shown in FIG. 3 (gap between electrodes: 200 μm, total electrode length: 5.6 mm) and applying a voltage of 100 V between the electrodes, and a resistivity ρ (Ω) determined from a current flowing between the electrodes is used as an effective surface resistivity.

(3) Charging Roller

The charging roller 2 is prepared by forming an elastic foamed layer 2*b* of a medium resistance on a metal core 2*a*. In the present embodiment, the elastic foamed layer 2*b* is formed by dispersing conductive carbon black particles in an urethane resin for resistance regulation and by foamed molding, and the surface is polished if necessary. In the present embodiment, a charging roller 2 of a diameter of 18 mm and a longitudinal length of 200 mm was employed as a standard. Also for measuring the time factor a to be explained later, there were prepared several samples different in the external diameter of the elastic foamed layer 2*b*, so as to vary the width of a nip W with the photosensitive drum 1.

A standard charging roller 2 of the present embodiment had a resistance of 100 kΩ. It was measured by pressing the charging roller 2 to an aluminum drum of 30 mm under a total pressure of 1 kg applied to the metal core 2*a*, and applying a voltage of 100 V between the metal core 2*a* and the aluminum drum.

In the charging method by direction charge injection, it is important that the charging roller 2 functions as an electrode. It is required to have an elasticity for obtaining a sufficient contact state, and to have a sufficiently low resistance for charging the moving member to be charged. On the other hand, it is necessary to prevent a voltage leakage, in case the member to be charged has a defect such as a pinhole. Thus, for obtaining a sufficient charging ability and a leak resistance, there is desired a resistance of $10^4$ to $10^7$ Ω in the above-described measuring method.

A microscopic contact to the surface of the photosensitive member deteriorates when a hardness of the charging roller 2 is excessively high or low. Therefore, there is preferred an Asker C hardness within a range of 25 degrees to 50 degrees. The standard charging roller 2 of the present embodiment had an Asker C hardness of 35 degrees.

(4) Conductive Particles

The present embodiment employed, as the conductive particles m, conductive tin oxide particles with a specific resistivity of $3\times10^3$ Ωcm. Such particles were uniformly coated on the surface of the charging roller 2 before the use.

The resistivity was measured by a tablet method and normalized. In a cylinder of a bottom area of 2.26 mm$^2$, a powder sample of about 0.5 g was charged, and a resistance was measured by applying a pressure of 15 kg between upper and lower electrodes and a voltage of 100 V at the same time. Then the specific resistivity was calculated by normalization.

The particle size was determined by extracting 100 or more particles in an observation under an optical or electron microscope, calculating a volumic particle size distribution from horizontal maximum chord lengths, and taking a 50% average particle size.

(5) Injection Charging Condition

As explained in the foregoing, the contact with the surface of the photosensitive drum is increased by contacting the charging roller 2 and the photosensitive drum 1 with a mutual speed difference and causing a frictional contact of the conductive particles m, present on the surface of the charging roller 2, with the surface of the photosensitive drum. Such improved contact increases the chances of charge transfer, thereby improving the injection charging property.

A width W (in mm, hereinafter represented by a same symbol W) of the nip N between the charging roller 2 and the photosensitive drum 1, and a density Nc (particle/mm$^2$) of the conductive particles m present on the surface of the charging roller 2 are important factors influencing the chances of contact of the conductive particles m. Also the peripheral speed Vc (mm/sec) of the charging roller 2, the peripheral speed Vd (mm/sec) of the photosensitive drum 1, and a peripheral speed ratio k (=Vc/Vd) thereof are factors determining a contact time of the conductive particle m and a total charge amount per unit time.

In the present embodiment, the width W of the nip N between the charging roller 2 and the photosensitive drum 1 was made variable within a range of about 0.5 to 5.0 mm by varying the diameter of the charging roller 2. Also driving apparatuses for the charging roller 2 and the photosensitive drum 1 were rendered respectively capable of arbitrarily changing the revolution.

The density Nc (particle/mm$^2$) of the conductive particles m on the surface of the charging roller 2 was determined by contacting a slide glass to a charging roller 2 in use under a condition same as that in forming the aforementioned contact, observing a contact surface with an optical microscope and averaging a count of the conductive particles m in a square with a side of 10 μm over about 10 positions. In case an optical counting of the number of the conductive particles m is difficult, an elementary analysis by a fluorescent X-ray analysis under a SEM was executed to determine an amount of a substance specific to the conductive particles m per a similar unit area in about 10 positions, and an average value thereof was converted by a predetermined converting equation to obtain an approximate number of the particles.

(6) Theoretical Consideration of Injection Charging Mechanism

In the following, there will be explained, with reference to FIGS. 4 to 6, a theoretical consideration on an injection charging mechanism of the present invention.

Figure 4:
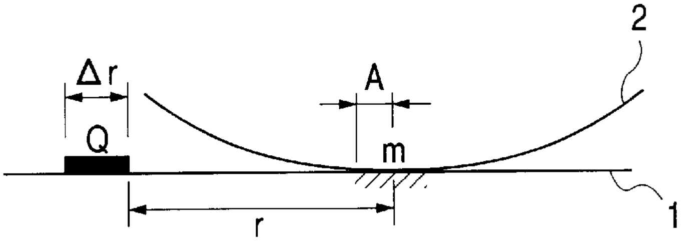
FIG. 4 is a schematic view showing a model of injection charging of the present invention.

At first reference is made to FIG. 4 for explaining a state of an injection charging by a single conductive particle m on the surface of the photosensitive member.

FIG. 4 shows a state in the vicinity of the conductive particle m at a certain moment in the nip N between the charging roller 2 and the photosensitive drum 1, assuming that a charge Q (C) is injected from the conductive particle m, along the surface of the photosensitive member, into a small area ΔS distant by a distance r (mm) from the conductive particle m.

Figure 5:
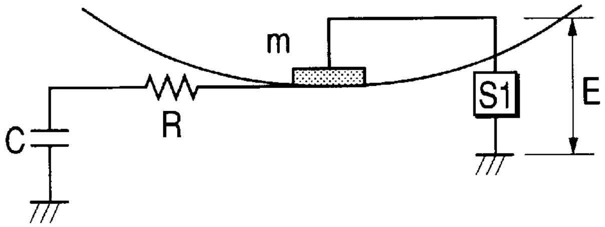
FIG. 5 is an equivalent circuit diagram of FIG. 4.

Assuming that a small area ΔS of the drum has an electrostatic capacitance C (F) and a path of a distance r (mm) along the surface of the photosensitive member has a resistance R (Ω), the situation shown in FIG. 4 in case of charging the small area ΔS to a target potential E (V) can be represented by an equivalent circuit shown in FIG. 5. By solving this equivalent circuit for the charge Q (C), taking time as a variable, there can be obtained a well-known following equation:

$$Q=CE\{1-\exp(-t/RC)\}$$

wherein RC is called a time constant having a unit of time (sec). The potential, represented in a percentage of the target potential E (V), can be determined from a charging time t (sec) represented in a number of times of the time constant RC.

Table 1 shows a charged potential, represented in a percentage X(%) of the target potential, as a function of a charging time t (sec) represented by a times of the time constant RC, namely $t=\alpha\cdot RC$. Hereinafter, a will be called a time factor.

TABLE 1

| α | X % |
|---|---|
| 1 | 63.2% |
| 3 | 95.0% |
| 5 | 99.32% |
| 9 | 99.99% |
| 12 | 99.999% |

Theoretically, as shown in Table 1, the potential exceeds 99% when α is 5 times the time constant RC and becomes about 99.99% when α is 9 times the time constant RC. In the configuration of the present invention, assuming that the conductive particle m is not mobile but is fixed to the charging roller 2, an upper limit of the contact time of the conductive particle m with the photosensitive drum 1 is equal to a time required for passing the width W (mm) of the nip N, namely Tc=W/Vc (sec). Therefore an injection charging is sufficiently possible in the case Tc where significantly exceeds the time constant RC but may become insufficient in the case Tc is approximately equal to RC (α≅1).

In the following, a further detailed consideration will be given. At first, there is calculated an area which a single conductive particle m has to charge.

For a longitudinal length L (mm) of the charging roller 2 and a total charging time to (sec), there are given:

a total contact area ($mm^2$) of the charging roller 2:

$$Sc=L\cdot(Vc\cdot t0+W) \quad (1)$$

a total contact area ($mm^2$) of the photosensitive drum 1:

$$Sd=L\cdot(Vd\cdot t0+W) \quad (2)$$

Also assuming that the conductive particles m are in contact, by a number Nd (particle/$mm^2$), with a unit area on the photosensitive drum 1, there stands an equation:

$$Nd=Nc\cdot Sc/Sd.$$

Since W is negligible under the condition of the present invention because of Vc·t0>>W and Vd·t0 >>W, the equations (1) and (2) are substituted with W=0 to obtain:

$$\begin{aligned} Nd &= Nc\cdot Sc/Sd \quad (3).\\ &= Nc\cdot Vc/Vd\\ &= Nc\cdot k \text{ (wherein } k = Vc/Vd) \end{aligned}$$

An area which a conductive particle m has to charge is a reciprocal of Nd. Assuming that such area is a circle of a radius rc (mm), rc can be represented by a following equation, based on a relation $\pi(rc)^2=1/Nd$:

$$rc=(\pi Nd)^{-1/2} \quad (4)$$

For an electrostatic capacitance Cd (F/$mm^2$) per unit area of the photosensitive member, an electrostatic capacitance C (F) of the area which a conductive particle m has to charge is given by:

$$C=Cd/Nd=Cd/(Nc\cdot k) \quad (5)$$

In the following, there will be considered a surface resistance of the photosensitive drum 1 in the area which a conductive particle m has to charge.

Figure 6:
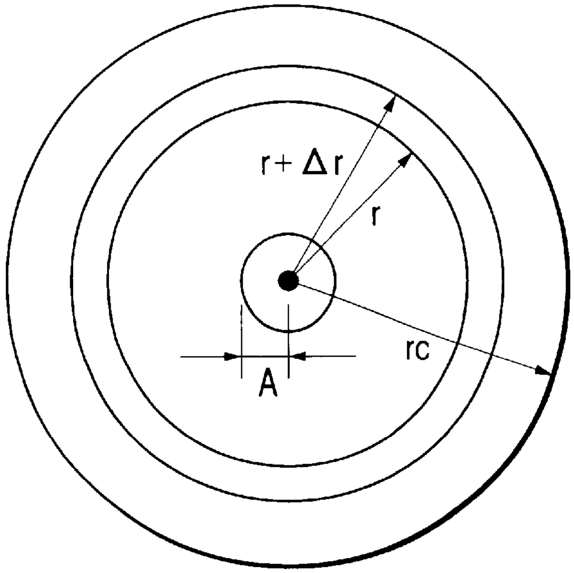
FIG. 6 is a schematic view showing a method for calculating the surface resistance of the photosensitive layer.

As shown in FIG. 6, a resistance ΔR (Ω) between a circular electrode of an external radius r (mm) and an electrode having a same center and an internal radius of r+Δr (mm) is generally given, for a small value of Δr (mm) and for a surface resistivity ρ0 (Ω), by a following formula:

$$\Delta R \cong \rho 0\cdot\Delta r/(2\pi r)$$

At a limit where Δr (mm)→0, an increase dR (Ω) of the resistance in the radial direction of the electrode of the radius r (mm) is represented by:

$$dR/dr=\rho 0/(2\pi r).$$

Assuming that the area of contact of the conductive particle m with the photosensitive drum 1 at a certain moment is a circle of a radius A (mm), a resistance R (Ω) of a circle-converted radius rc (mm) of the aforementioned area, which the single conductive particle m has to charge, is given by integrating the aforementioned equation from A (mm) to rc (mm) as follows:

$$R=(\rho 0/2\pi)\cdot\{1n(rc)-1nA\} \quad (8)$$

(wherein 1n indicates a natural logarithm).

By replacing the surface resistivity ρ0 (Ω) with the resistivity ρ (Ω) of the surface layer obtained by the aforementioned measuring method, the time constant RC in the aforementioned circle-converted model of the charging area per a conductive particle m can be obtained by substituting the equations (4) and (5) into (3) as follows:

$$RC=(\rho/2\pi)\cdot Cd/(Nc\cdot k)\cdot\{-0.5\cdot 1n(\pi\cdot k\cdot Nc)-1nA\}$$

Therefore, the time factor can be represented, based on t=α·RC and t=W/Vc, as follows:

$$\alpha=2\pi\cdot k\cdot Nc\cdot(W/Vc)/(\rho\cdot Cd\cdot Z)$$

wherein Z=−0.5·1n(π·k·Nc)−1nA.

In the foregoing equation, A is a parameter indicating an assumed contact area of the conductive particle m, and can assume an arbitrary value. However, in order that a becomes a meaningful index, it is required to assume a certain suitable value as a reference therefore and it preferably meets following requirements:

1. There is required a value correlated with the diameter D of the employed conductive particle m;
2. It is necessary to consider the number (upper limit value) of the conductive particles m which are capable of actual contact; and
3. Since α is correlated with the time constant, it is necessary to select a condition that Z does not become negative in most conceivable cases.

Except for these limitations, one may conceive a simplified ideal state. Specifically, there is assumed an ideal state where the conductive particles m are present in sufficient amount, and all the portions in contact with the conductive particles m are charged even in case the photosensitive drum 1 and the charging roller 2 have a zero relative speed (k=1). Also there is assumed the situation where, in a close packed state of the spherical conductive particles m of a diameter D on the charging roller 2, each of the particles is in contact with an area (1/Nd) of the photosensitive drum 1 that has to be charged by a conductive particle m (thus the conductive particle m being capable of direct charge injection). This corresponds to a situation where the rigid spherical conductive particles m, filling the surface of the charging roller 2 without leaving a space, are crushed between the photosensitive drum 1 and the charging roller 2 thereby contacting the surface of the photosensitive drum 1 without leaving a space thereon.

In such assumed state, a circle-converted area $\pi \cdot rc^2$ ($mm^2$) of the aforementioned area (1/Nd) and a projected area $\pi \cdot (D/2)^2$ ($mm^2$) of a spherical conductive particle m of a diameter D onto the photosensitive drum 1 are correlated with a closest packing $\sigma$ (=0.8387) as follows:

$$\pi \cdot rc^2 : \pi \cdot (D/2)^2 = 1 : \sigma$$

In the foregoing assumption, since A=rc, a following equation is obtained by taking $\beta = \sigma^{-1}$:

$$A = rc = \sigma^{-1/2} \cdot (D/2) = \sqrt{\beta} \cdot D/2.$$

In case of a good injection charging property, a satisfactory match with the aforementioned model is obtained since the injection charging is completed within a time far shorter than the time required by the conductive particle m to pass through the width W of the nip N. It is to be noted that the deviation from the aforementioned model becomes larger as the charging takes longer because of the inferior injection charging property, or as the contact time becomes shorter. Therefore, the deviation from the correlation between the time factor $\alpha$ and the percentage X(%) shown in Table 1 becomes larger as the value of $\alpha$ becomes smaller. For example, an $\alpha$ value of 5 cannot guarantee a charging by 99%. However, it is still effective as an index for the injection charging property, since the injection charging property becomes inferior and the time factor $\alpha$ converges to 0 as the deviation from the aforementioned model becomes larger.

Based on the foregoing, it is necessary to newly determine a threshold value of $\alpha$ whether the injection charging property can be retained.

(7) Determination of Threshold Value for Time Factor $\alpha$

In the image forming apparatus of the present embodiment, the aforementioned threshold value of $\alpha$ was determined by investigating the injection charging property under a variation in the parameters of the time factor $\alpha$. As a situation where the injection charging was difficult, there were conceived a situation with a thin photosensitive layer (case of abrasion of the photosensitive drum 1) and a situation where the density Nc of the conductive particles m was reduced to a level of 100 to 1000 (particle/$mm^2$). Under such situations, the time factor $\alpha$ was determined by varying parameters shown in the following and the result of injection charging (mainly presence or absence of an uneven charging in the image formation and status of fogging on the drum) was evaluated.

A. Resistivity of surface layer: Results obtained by varying $\rho$ are summarized in the following.

Other parameters were as follows:

| | |
|---|---|
| film thickness of photosensitive drum: | Y ≅ 10 (μm) |
| electrostatic capacitance per unit area: | Cd ≅ $3.98 \times 10^{-12}$ (F) |
| diameter of conductive particle m: | D = 0.5 (μm) |
| nip width: | W = 2.0 (mm) |
| peripheral speed of charging roller 2: | Vc = 85.5 (mm/sec) |
| peripheral speed of photosensitive drum 1: | Vd = 171 (mm/sec) |
| peripheral speed ratio: | k = 0.5 |
| density of conductive particles: | Nc ≅ 1000 (particle/$mm^2$) |

TABLE 2

| resistivity of surface layer: ρ (Ω) | density: Nc (particle/ $mm^2$) | time factor: α | charge state |
|---|---|---|---|
| $9.82 \times 10^{10}$ | 986 | 40.8 | very satisfactory |
| $2.11 \times 10^{11}$ | 977 | 18.8 | very satisfactory |
| $3.01 \times 10^{11}$ | 980 | 13.2 | very satisfactory |
| $5.06 \times 10^{11}$ | 964 | 7.7 | satisfactory |
| $6.06 \times 10^{11}$ | 1005 | 6.8 | uneven charging |
| $1.01 \times 10^{12}$ | 980 | 3.9 | defective charging |
| $1.01 \times 10^{12}$ | 1980 | 8.6 | slight uneven charging |
| $1.01 \times 10^{12}$ | 2550 | 11.5 | very satisfactory |

As shown in Table 2, a change in the resistivity ρ (Ω) of the surface layer of the photosensitive member shows that a threshold value for the uneven charging is present at a time factor $\alpha$ of about 7 to 9, though there are some fluctuations.

A satisfactory charging is obtained in a range $\alpha > 12$.

B. Particle size of conductive particles on charging roller: Results obtained by varying D and density Nc are shown in the following. Other parameters were as follows:

| | |
|---|---|
| resistivity of surface layer: | ρ = $3.01 \times 10^{11}$ (Ω) |
| film thickness of photosensitive drum: | Y ≅ 10 (μm) |
| electrostatic capacitance per unit area: | Cd ≅ $3.98 \times 10^{-12}$ (F) |
| nip width: | W = 2.0 (mm) |
| peripheral speed of charging roller 2: | Vc = 85.5 (mm/sec) |
| peripheral speed of photosensitive drum 1: | Vd = 171 (mm/sec) |
| peripheral speed ratio: | k = 0.5 |

TABLE 3

| diameter of charging accelerating particle: D (μm) | density: Nc (particle/ $mm^2$) | time factor: α | charge state |
|---|---|---|---|
| 0.5 | 510 | 6.4 | defective charging |
| 1.3 | 496 | 7.8 | uneven charging |
| 2.4 | 514 | 9.6 | uneven charging |
| 5.0 | 490 | 11.6 | satisfactory |
| 0.5 | 755 | 9.9 | satisfactory |
| 1.3 | 754 | 12.4 | satisfactory |
| 2.4 | 742 | 14.6 | very satisfactory |
| 0.5 | 1012 | 13.7 | satisfactory |
| 1.3 | 1002 | 17.2 | very satisfactory |
| 2.4 | 1012 | 21.0 | very satisfactory |

Table 3 shows the results obtained by changing the size D of the conductive particles and the density Nc. The defective charging or uneven charging tends to occur for a smaller time factor $\alpha$.

A threshold value for the uneven charging is considered to be present at a time factor $\alpha$ of about 10, though there are some fluctuations.

C. Circumferential width of nip: Results obtained by varying W are shown in the following.

The revolution was regulated according to the diameter of the charging roller, so as to obtain a constant peripheral speed Vc of the charging roller. Also the pressure to the photosensitive drum 1 was regulated substantially constant. Other parameters were as follows:

| | |
|---|---|
| resistivity of surface layer: | ρ = $3.01 \times 10^{11}$ (Ω) |
| film thickness of photosensitive drum: | Y ≅ 10 (μm) |
| electrostatic capacitance per unit area: | Cd ≅ $3.98 \times 10^{-12}$ (F) |
| peripheral speed of charging roller 2: | Vc = 85.5 (mm/sec) |

-continued

| | |
|---|---|
| peripheral speed of photosensitive drum 1: | Vd = 171 (mm/sec) |
| peripheral speed ratio: | k = 0.5 |
| density of conductive particles: | Nc ≅ 775 (particle/mm$^2$) |
| diameter of conductive particles m | D = 1.3 ($\mu$m) |

TABLE 4

| nip width: W (mm) | density: Nc (particle/mm$^2$) | time factor: $\alpha$ | charge state |
|---|---|---|---|
| 1.4 | 777 | 9.0 | defective charging |
| 1.7 | 786 | 11.1 | slight uneven charging |
| 2.0 | 772 | 12.8 | satisfactory |
| 2.4 | 780 | 15.5 | satisfactory |
| 3.0 | 775 | 19.3 | very satisfactory |
| 5.0 | 765 | 31.6 | very satisfactory |

Table 4 shows results obtained by varying the diameter of the charging roller, thereby changing the nip width between the photosensitive drum 1 and the charging roller 2. A threshold value for generation of the uneven charging is present at a time factor $\alpha$ of about 12.

D. Results obtained by varying the peripheral speed Vc of the charging means and the peripheral speed Vd of the image bearing member are shown in the following. Other parameters were as follows:

| | |
|---|---|
| resistivity of surface layer: | $\rho = 3.01 \times 10^{11}$ ($\Omega$) |
| film thickness of photosensitive drum: | Y ≅ 10 ($\mu$m) |
| electrostatic capacitance per unit area: | Cd ≅ $3.98 \times 10^{-12}$ (F) |
| nip width: | W = 2.0 (mm) * [5.0 (mm)] |
| density of conductive particles: | Nc ≅ 758 (particle/mm$^2$) * [765 (particle/mm$^2$)] |
| diameter of conductive particles m: | D = 1.3 ($\mu$m) |

TABLE 5

| peripheral speed: Vd (mm/sec) | peripheral speed: Vc (mm/sec) | contact time: Tc (sec) | time factor: $\alpha$ | charge state |
|---|---|---|---|---|
| 171 | 17.1 | 0.12 | 10.3 | uneven charging |
| 171 | 68.4 | 0.03 | 12.2 | satisfactory |
| 171 | 136.8 | 0.015 | 13.4 | satisfactory |
| 250 | 25.0 | 0.08 | 7.0 | defective charging |
| 114 | 11.4 | 0.18 | 15.4 | satisfactory |
| 86 | 6.9 | 0.29 | 20.0 | very satisfactory |
| 86 | 6.0 | 0.33 | 19.7 | slight streaks |
| 86 | 4.3 | 0.66 | 19.0 | streaked unevenness |
| 86 | *17.2 | *0.29 | 56.0 | very satisfactory |
| 86 | *12.9 | *0.39 | 54.1 | slight streaks |

Table 5 shows results obtained by varying the peripheral speeds Vd (mm/sec) and Vc (mm/sec) under the control in the developing apparatus. Figures with asterisk (*) in the two bottom rows of the table indicate a case of employing a charging roller 2 with a nip width W of 5.0 (mm).

A comparison of the cases in top six rows in the table indicates that a threshold value for the uneven charging is present at a time factor $\alpha$ within a range of 10 to 12.

Also, as indicated in a case with a peripheral speed Vd of 86 mm/sec, an unevenness in longitudinal streaks may be generated in case the retention time Tc (=W/Vc) of the conductive particle m within the nip W is long even in case $\alpha$ is about 20 or more and satisfies a condition $\alpha>15$. This is presumably because, though the injection charging property is generally high, the number of the conductive particles m contributing to the injection charging is reduced and the charging uniformity is deteriorated by a deviation in the distribution of the conductive particles m.

Also based on a comparison of the data in the five bottom rows of the table, Tc is preferably 0.3 (sec) or less.

As explained in the foregoing items A to D, threshold values for the generation of image defects relating to the defective injection charging are present at a time factor a within a range of 10 to 13, though there are some fluctuations depending on the parameter. It is therefore possible to avoid the charging failure in the injection charging, by so regulating the parameters as that the time factor $\alpha$ determined by the equations of the present invention becomes 15 or larger, including a certain safety margin.

(8) Applicable Range of Parameters

The photosensitive member employed in the present embodiment has a charge injection layer 16, but such layer is adopted merely for facilitating a change in the resistivity $\rho$ of the surface layer, and there may also be employed a photosensitive member having an ordinary photosensitive layer without the charge injection layer or an amorphous silicon photosensitive member. However, in any photosensitive member, for retaining the electrostatic latent image in a high humidity environment, the lower limit of the resistivity $\rho$ of the surface layer has to be $10^9$ ($\Omega$) or higher. In the present invention, the resistivity $\rho$ of the surface layer is not particularly restricted in the upper limit as long as $\alpha>15$ is satisfied, but the setting conditions for other parameters become narrower as the value $\rho$ becomes larger.

Among the parameters relating to the time factor $\alpha$, the resistivity $\rho$ of the surface layer is a principal parameter determined by the initial setting. In order to widen the setting conditions for other parameters, the resistivity $\rho$ of the surface layer is preferably within a following range:

$$1.0\times10^9<\rho<5.0\times10^{11}(\Omega).$$

The image bearing member employed in the embodiment of the present invention is a photosensitive drum of a diameter of 30 mm, having a photosensitive layer on an aluminum cylinder, but the diameter is naturally not limited to such value and can be arbitrarily selected at a value necessary for the image formation. Also the shape is not limited to a cylindrical drum but may be replaced by a seamless belt or the like.

The charging means for carrying the conductive particles of the present invention is not limited to the elastic foamed member obtained by dispersing carbon black particles in urethane resin as described in the embodiment, but can be a rubber material such as EPDM, NBR, urethane or silicone or a foamed member thereof, capable of carrying the conductive particles m on the surface and having a resistance level not hindering the charge injection. Naturally the external diameter can be selected arbitrarily. As to the shape, a roller shape is easy to use, but such shape is not restrictive as long as a certain contact area can be maintained with a speed difference to the image bearing member according to the concept of the present invention.

The conductive particles are not limited to those of tin oxide described in the embodiment but can also be conductive particles based on a metal oxide such as zinc oxide, titanium oxide, antimony oxide, indium oxide, bismuth oxide or zirconium oxide doped with another metal oxide, or organic resin particles with a regulated resistance by mixing fine particles of the aforementioned metal oxide or graphite.

Even in the case where time factor $\alpha>15$ is satisfied, there still exists a lower limit, for the defective charging, of the density Nc (particle/mm$^2$) of the conductive particles, and, in the present embodiment, an unevenness in the form of longitudinal streaks appears in case the density becomes 50 to 70 (particle/mm$^2$) or less. Such phenomenon results from the fact that the conductive particles, if they have a deviated distribution, cannot cover the entire charging area, and a lower limit of the density capable of securely covering the entire charging area while satisfying the condition of time factor $\alpha>15$ is 100 (particle/mm$^2$). On the other hand, an upper limit of the density Nc (particle/mm$^2$) of the conductive particles is a state where the conductive-particles cover the entire surface of the charging means, and, assuming a close packed state with spherical conductive particles, $2.14\times10^4$ (particle/mm$^2$) for particles of 5 $\mu$m or $5.34\times10^6$ (particle/mm$^2$) for particles of 0.5 $\mu$m. The conductive particles in excess of such amount are theoretically not in a direct contact with the photosensitive layer, and are outside the applicable range of the contact model of the present invention.

A size of the conductive particles is not particularly restricted in the function as a charge injection accelerating agent, but the conductive particles of a size of 0.1 $\mu$m or less are often embedded in the interior of the charging means or often stick to the developer, so that the contact state with the image bearing member does not match the contact model of the present invention. Also there is known a drawback that larger conductive particles in excess of the size of the developer are easily detached from the charging means and partly adhering to the image bearing member, thereby hindering the exposure for latent image formation. In the present invention, therefore, the conductive particles preferably has a particle size, as a range for matching the contact model of the present invention and not inducing other drawbacks, of 0.5 $\mu$m of larger but not exceeding the particle size of the toner.

In the present invention, a nip width W (mm) between the image bearing member and the charging means is an important factor defining the contact time. There is no upper limit for the nip width W (mm) from the standpoint of securing the injection charging property. However, in case of securing a nip width of 5.0 mm in item C of the present embodiment, the charging roller has a diameter of 24 mm, which is much larger than the diameter of a charging roller employed in the prior charging by discharge. In order to increase the nip width W in excess of 5.0 mm, there can be conceived methods of reducing the hardness of the charging roller or increasing the pressure to the photosensitive member, but there are anticipated a situation where the contact pressure in the nip becomes significantly different between a central portion and end portions of the nip and the load for driving becomes considerably high, so that such methods are unrealistic because of excessively large mechanical and dynamic burdens in the configuration of the apparatus. It was also confirmed, as shown in Table 5 in the item D of the embodiment, that the conductive particles remaining unnecessarily long (Tc<0.3 (sec)) in the nip W tended to cause streaked image defects. Therefore, a preferred range of the nip width W is 2.0 to 5.0 (mm).

In the present embodiment, there has been shown a case where the periphery of the charging means and the periphery of the image bearing member are rotated in mutually opposite directions, but they may also be rotated in a same direction. Theoretically, the contact model of the present invention is applicable also to a case of rotation in the same direction, and it is not necessary, in the contact injection charging system utilizing the conductive particles, to limit the driving directions of the charging means and the image bearing member.

As explained in the foregoing, the present invention allows verification in advance of a charging condition in a contact injection charging method utilizing conductive particles, and to estimate applicable design ranges of the individual parameters under various situations, thereby providing a charging system, an image forming apparatus and a process unit having a high stability of charging under environmental conditions or in durability.

The present invention is not limited to the foregoing embodiments but is subject to any and all modifications within the technical concept of the present invention.

What is claimed is:

1. An image forming apparatus comprising:

an image bearing member;

a charging member for forming a nip with said image bearing member thereby charging said image bearing member, wherein conductive particles are provided in said nip;

wherein a time factor $\alpha$ represented by a following equation satisfies a condition $\alpha>15$:

$$\alpha=2\pi\cdot k\cdot Nc\cdot(W/Vc)/(\rho\cdot Cd\cdot Z)$$

$$Z=-0.5\cdot \ln(\pi\cdot k\cdot Nc)-\ln(\sqrt{\beta}\cdot D/2)$$

$$(\beta=1.1932)$$

in which $\rho$ ($\Omega$) represents a surface resistivity of said image bearing member; Cd (F/mm$^2$) represents an electrostatic capacitance of the image bearing member; D (mm) represents a diameter of said conductive particle; Nc (particle/mm$^2$) represents a density of said conductive particles present on said charging member; Vc (mm/sec) represents a surface moving speed of said charging member; Vd (mm/sec) represents a surface moving speed of said image bearing member; k=Vc/Vd; and W (mm) represents a width of said nip in the moving direction of said image bearing member.

2. An apparatus according to claim 1, wherein said resistivity $\rho$ is within a range of $1.0\times10^9$ to $5.0\times10^{11}$($\Omega$).

3. An apparatus according to claim 1, wherein said density Nc is within a range of $1.0\times10^2$ to $5.0\times10^6$ (particle/mm$^2$).

4. An apparatus according to claim 1, wherein W/Vc is 0.3 (sec) or less.

5. An apparatus according to claim 1, wherein said width W is within a range of 2.0 to 5.0 (mm).

6. An apparatus according to claim 1, further comprising development means which develops an electrostatic image, formed on said image bearing member, with a developer; and transfer means which transfers an image of said developer from said image bearing member to an image receiving member.

7. An apparatus according to claim 6, wherein said developer includes a toner, and said conductive particles have an average particle size of 0.5 $\mu$m or higher and equal to or smaller than the particle size of said toner.

8. An apparatus according to claim 6, wherein said development means is capable of an operation of recovering a residual developer on said image bearing member, simultaneous with a development operation.

9. An apparatus according to claim 8, wherein said developer includes said conductive particles, and said development means supplies said image bearing member with said conductive particles, and said conductive particles carried by said image bearing member are conveyed to said charging member.

10. An apparatus according to claim 1, wherein said image bearing member includes a charge injection layer on a surface thereof.

11. A process cartridge detachably mountable on a main body of an image forming apparatus, the process cartridge comprising:

an image bearing member;

a charging member for forming a nip with said image bearing member thereby charging said image bearing member, wherein conductive particles are provided in said nip;

wherein a time factor α represented by a following equation satisfies a condition α>15:

$$\alpha = 2\pi \cdot k \cdot Nc \cdot (W/Vc)/(\rho \cdot Cd \cdot Z)$$

$$Z = -0.5 \cdot 1n(\pi \cdot k \cdot Nc) - 1n(\sqrt{\beta} \cdot D/2)$$

$$(\beta = 1.1932)$$

in which ρ (Ω) represents a surface resistivity of said image bearing member; Cd (F/mm$^2$) represents an electrostatic capacitance of the image bearing member; D (mm) represents a diameter of said conductive particle; Nc (particle/mm$^2$) represents a density of said conductive particles present on said charging member; Vc (mm/sec) represents a surface moving speed of said charging member; Vd (mm/sec) represents a surface moving speed of said image bearing member; k=Vc/Vd; and W (mm) represents a width of said nip in the moving direction of said image bearing member.

12. A process cartridge according to claim 11, wherein said resistivity ρ is within a range of $1.0\times10^9$ to $5.0\times10^{11}$ (Ω).

13. A process cartridge according to claim 11, wherein said density Nc is within a range of $1.0\times10^2$ to $5.0\times10^6$ (particle/mm$^2$).

14. A process cartridge according to claim 11, wherein W/Vc is 0.3 (sec) or less.

15. A process cartridge according to claim 11, wherein said width W is within a range of 2.0 to 5.0 (mm).

16. A process cartridge according to claim 11, further comprising development means which develops an electrostatic image, formed on said image bearing member, with a developer; and transfer means which transfers an image of said developer from said image bearing member to an image receiving member.

17. A process cartridge according to claim 16, wherein said developer includes a toner, and said conductive particles have an average particle size of 0.5 μm or higher and equal to or smaller than the particle size of said toner.

18. A process cartridge according to claim 16, wherein said development means is capable of an operation of recovering a residual developer on said image bearing member, simultaneous with a development operation.

19. A process cartridge according to claim 18, wherein said developer includes said conductive particles, and said development means supplies said image bearing member with said conductive particles, and said conductive particles carried by said image bearing member are conveyed to said charging member.

20. A process cartridge according to claim 11, wherein said image bearing member includes a charge injection layer on a surface thereof.

21. A charging system comprising:

a member to be charged;

a charging member for forming a nip with said member to be charged thereby charging said member to be charged, wherein conductive particles are provided in said nip;

wherein a time factor α represented by a following equation satisfies a condition α>15:

$$\alpha = 2\pi \cdot k \cdot Nc \cdot (W/Vc)/(\rho \cdot Cd \cdot Z)$$

$$Z = -0.5 \cdot 1n(\pi \cdot k \cdot Nc) - 1n(\sqrt{\beta} D/2)$$

$$(\beta = 1.1932)$$

in which ρ (Ω) represents a surface resistivity of said member to be charged; Cd (F/mm$^2$) represents an electrostatic capacitance of the member to be charged; D (mm) represents a diameter of said conductive particle; Nc (particle/mm$^2$) represents a density of said conductive particles present on said charging member; Vc (mm/sec) represents a surface moving speed of said charging member; Vd (mm/sec) represents a surface moving speed of said member to be charged; k=Vc/Vd; and W (mm) represents a width of said nip in the moving direction of said member to be charged.

* * * * *

UNITED STATES PATENT AND TRADEMARK OFFICE

CERTIFICATE OF CORRECTION

PATENT NO. : 6,741,824 B2 
DATED : May 25, 2004
INVENTOR(S) : Masaki Ojima et al.

It is certified that error appears in the above-identified patent and that said Letters Patent is hereby corrected as shown below:

Title page,
Item, [57], ABSTRACT,
Line 1, “member,” should read -- member --.
Line 5, “a” (1st occurrence) should read -- the --.

Column 1,
Line 44, "allows" should read -- allows one --.
Line 67, "a" should be deleted.

Column 2,
Line 21, "resisvisity" should read -- resistivity --.

Column 3,
Line 17, "charting" should read -- charging --.

Column 4,
Line 61, "in the" should be deleted.

Column 5,
Line 13, "factor a" should read -- factor α --.
Line 24, "direction" should read -- direct --.

Column 6,
Line 50, "R (Q)," should read -- R (Ω), --.
Line 65, "by a" should read -- by α --.
Line 66, "a will" should read -- α will --.

Column 7,
Line 19, "Tc where" should read -- where Tc --.
Line 26, "to" should read -- t0 --.

Column 8,
Line 30, "factor" should read -- factor α --.
Line 36, "that a" should read -- that α --.
Line 39, "meets" should read -- meets the --.

UNITED STATES PATENT AND TRADEMARK OFFICE

CERTIFICATE OF CORRECTION

PATENT NO. : 6,741,824 B2
DATED : May 25, 2004
INVENTOR(S) : Masaki Ojima et al.

It is certified that error appears in the above-identified patent and that said Letters Patent is hereby corrected as shown below:

Column 9,
Line 34, "determine" should read -- determine for --.

Column 12,
Line 5, "factor a" should read --factor α --.

Column 13,
Line 7, "conductive-particles" should read -- conductive particles --.
Line 12, "a" should be deleted.
Line 28, "has" should read -- have --.
Line 30, "of" (2nd occurrence) should read -- or --.
Line 44, "are" should read -- is --.

Column 14,
Line 1, "to estimate" should read -- estimation of --.
Line 5, "or in durability." should read -- or durability --.
Line 16, "a" (2nd occurrence) should read -- the --.

Column 15,
Line 6, "a" (2nd occurrence) should read -- the --.

Column 16,
Line 22, "a" (2nd occurrence) should read -- the --.
Line 25, "$Z = 0.5 \cdot \ln(\pi \cdot k \cdot Nc) - \ln(\sqrt{\beta D} / 2)$" should read
--$Z = 0.5 \cdot \ln(\pi \cdot k \cdot Nc) - \ln \sqrt{\beta} \cdot D / 2)$ --.

Signed and Sealed this

Twenty-sixth Day of October, 2004

JON W. DUDAS
*Director of the United States Patent and Trademark Office*